June 28, 1960    J. B. VON CANON, JR    2,942,279
BED SPRING CONNECTOR
Filed March 6, 1957
FIG. 2.
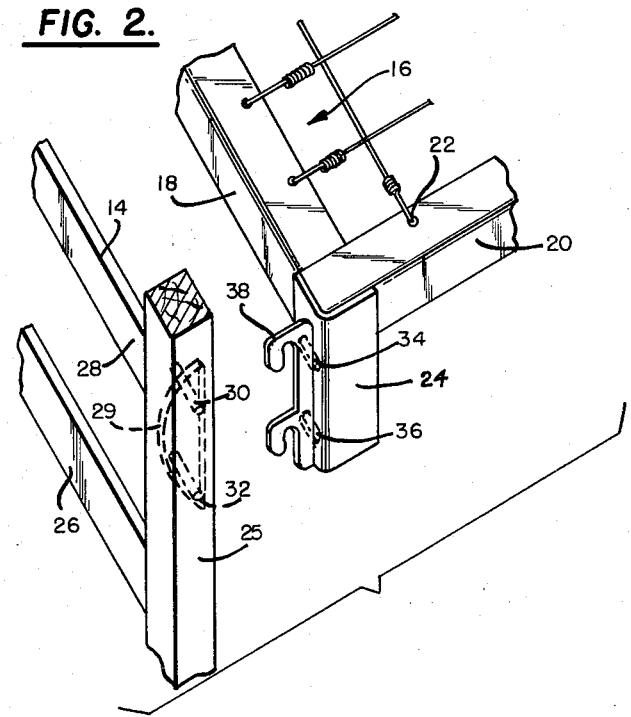
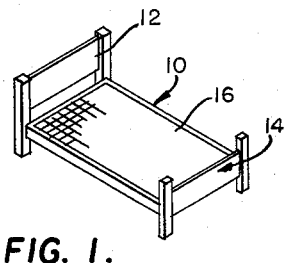
FIG. 1.
FIG. 3.
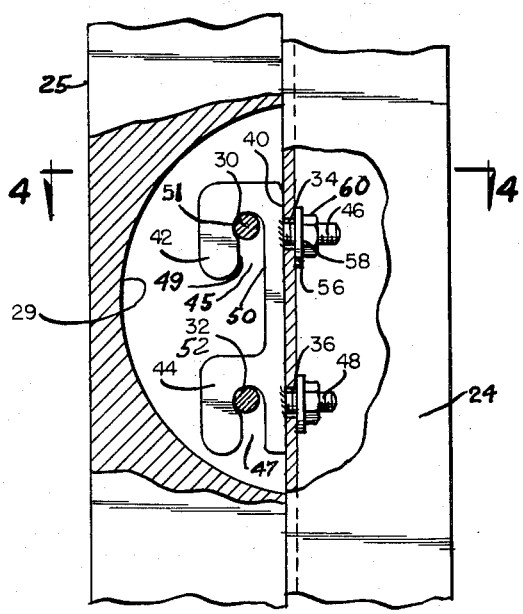
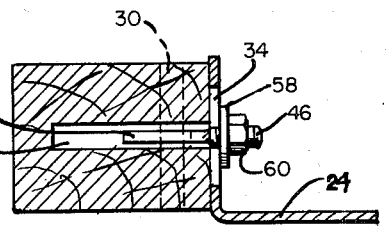
FIG. 4.
INVENTOR.
John B. Von Canon, Jr.
BY
ATTORNEYS

United States Patent Office 2,942,279
Patented June 28, 1960

2,942,279

BED SPRING CONNECTOR

John B. Von Canon, Jr., % Sandhill Furniture Corp., West End, N.C.

Filed Mar. 6, 1957, Ser. No. 644,365

1 Claim. (Cl. 5—296)

This invention relates to improvements in beds and in particular to apparatus for attaching bed springs to frames.

More specifically, this invention relates to the attachment of springs such as used in bunk beds to bed head and foot rails in such a manner as to secure a rattleproof connection which cannot be accidentally separated, and also to means for facilitating the connection of the bed springs directly to the bed head and foot rails.

Bed frames are formed generally of side rail elements which are connected to the head and foot rails, and the springs are supported on slats extending between the side rails. However, in one form of construction the springs are attached directly to the head and foot rails. Such structure is essential in bunk beds or any other type of bed wherein one spring is on top or above another in order to reduce the danger of accidental separation of the springs from the bed frame. Heretofore in forming bunk beds the same construction has been utilized as was used for many years in uniting head rails with side rails in ordinary beds. However, such construction is not entirely satisfactory as generally the connections are loose enough so that the springs can become separated from the head or foot rails under the strains of bouncing or other activities particularly of young children at play. As a result, many children have been injured while playing on bunk beds due to springs separating from frames. Accordingly one of the objects of this invention is to provide means for attaching bed springs directly to the head and foot rails of beds which provide a secure rattleproof connection which cannot be accidentally separated.

As mentioned above the practice, heretofore considered acceptable, is to use the same construction for attaching the springs to the head and foot rails as has been used in recent years for attaching the side rails. One other disadvantage, which often becomes a considerable problem in commerce, and which is due to the adaptation of the same construction to springs as was used with side rails, is that the connecting elements attached to the springs which are associated with the mating elements on the head and foot rails are fixed distances apart. Since the mating elements in the head and foot rails are also a fixed distance apart, it is necessary that these distances be accurately controlled or else a connection cannot be made and there will be a substantial problem of matching springs and head and foot rails. Thus there is created a considerable manufacturing and assembly problem. The status of the industries involved in bed making is such as to create a serious problem in maintaining standard spacing between the connecting elements. One problem arises from the fact that the industry is highly specialized and frames and springs are made by different companies. Often even wooden side rails are made by a different firm than that making the wooden head and foot rails or boards for a plain wooden frame bed. Further accurate dimension control, particularly with the wooden elements would greatly increase the cost of beds even if the cost of matching would be eliminated. As a result of the price limitations and the specialization there is sufficient variation in the manufacture as to often make it necessary to select the head rails for the spring. Further, much to the distress of the ultimate customer or retailer and to the detriment of further business association, it is often difficult to assemble bed sets even though a rough selection may have been made before packing in sets such as is done in mail order houses. In some instances it has been impossible to assemble beds due to the difference in spacing between the connecting elements on the spring and those on head or foot rails.

Another disadvantage with beds such as bunk beds or other beds which are subject to heavy use lies in the spacing of the springs from the head and foot rails. Though directly connected these elements are often loosely connected, or separated sufficiently, so as to greatly increase the strain on the connections. This results in increased strain and possibility of damage as well as a shorter life. Accordingly a further object of the invention is to provide an apparatus for connecting springs directly to head and foot rails with which these elements will be integrally and rigidly connected so that there will be no looseness which can be accentuated by rough play or which will increase the strain on the parts.

It is a further object of the invention to provide means for directly connecting bed springs to head and foot rails so as to form a rigid single unit bed capable of withstanding great strain, embodying elements which will remain in fixed position with respect to each other, in which adjustment to accommodate inaccuracies and variations in slot widths between connecting elements on the head and foot rails and width between the connecting elements on the spring frame can be made during assembly.

A further object of the invention is to provide a means for associating bed springs with head and foot rails with which the bed springs are jammed tightly against the head and foot rails.

Yet another object of the invention is to provide a bed spring connector means adapted for use in connecting springs and head and foot rails of beds in an adjustable, yet in a fixed secure manner, which is of simple construction, strong, and which can be easily and cheaply fabricated.

Still another object of the invention is to provide a bed spring connector and bed spring construction with which the spacing between paired connectors at the ends of the spring can be adjusted in order to vary the spacing between a pair of such means.

A still further object of the invention is to provide a structure set forth above which can be assembled by an average person easily and yet which will result in a strong and secure fastening of the elements forming a bed particularly adapted for use with bed-room furniture such as bunk beds, for example, and which will result in increased safety with such types of bedroom furniture.

These and other objects and advantages will become apparent from the following description and accompanying drawings wherein:

Figure 1 is a perspective view showing a bed constructed in accordance with the invention.

Figure 2 is a fragmentary perspective view illustrating connector structure formed in accordance with the invention.

Figure 3 is a fragmentary elevational view with some elements broken away to illustrate the structure for the connecting means more clearly.

Figure 4 is a sectional view taken along line 4—4 of Figure 3.

Referring now particularly to the drawings: The bed 10 is formed of a head rail or board 12, a foot rail or board 14, and a spring 16 The spring comprises frame elements 18 and 20 joined, preferably by welding, to form a rectangular spring frame. The latter frame elements are provided with spaced openings 22 to support the resilient spring lattice in the usual manner. The rail members 18 and 20 are joined to corner posts 24 at each of the four corners of the spring.

The head and foot rails 12 and 14 can be formed of posts 25 joined by rails 26, 28, or panels, or can be of any other suitable construction as dictated by taste.

As is common in the art, the posts 25 of the head and foot rails are slotted by suitable means such as a saw to provide the slots 29. A pair of pins 30, 32 are driven laterally through each of the slots 29. These pins are spaced vertically above each other and are adapted to cooperate with connectors on the side rails or spring frames as hereinafter described.

The post 24 is provided with a pair of vertically spaced longitudinally extending slots 34 and 36 in one leg thereof, and is thereby adapted to cooperate with a connector 38. The connector 38 has a web 40 and two hooks 42, 44 vertically spaced one above the other. The connector further comprises two spaced bolts 46 and 48 integrally connected to the web 40 by welding. Two hooklike portions 42 and 44 are formed by cutting out slots 45 and 47. These slots open downwardly and outwardly of the connector and are adapted to receive the pins 30 and 32. Each of the slots has spaced side walls 49 and 50, and is enlarged at its upper end to provide recesses 51 and 52. This enlarged portion is circular and of a diameter equal to that of the pins 30 and 32 but is offset to one side of the slot leading thereto.

The studs 46 and 48 are adapted to be inserted through the slotted openings 34 and 36 and cooperate with washers 58 and nuts 60.

In connecting the spring to the head and foot rails the connector or latch members 38 are first attached to the corner member 24 of the spring, and then the nuts and washers are loosely connected to the bolts 46 and 48. Then the hooks 42, 44 are moved into the slots 29 and placed over the pins 30 and 32. Next the spring is pushed downwardly until the pins are at the upper ends of the slots 45 and 47. Thereupon the nuts are tightened and as a result the pins will be forced into the recesses 51 and 52 and the post 24 will be forced against the corner post 25. The pins cannot move out of the recesses once the nuts are tightened. This results in a firm attachment of the spring to the head and foot rails. It is practically impossible to loosen this connection.

This construction is particularly desirable with bunk beds. No amount of shaking or jumping by children will cause separation or damage. Further, the adjustability and resulting ease of assembly is obviously of considerable advantage from the standpoint of the manufacturers, dealers and consumers.

While I have down and described a preferred form of my invention, it will be understood by those skilled in the art that many changes in form and details of construction can be made within the scope of the appended claims, and I accordingly claim an exclusive right to all changes, modifications, and forms coming within the scope of the appended claims.

I claim:

A bed construction comprising, in combination, a spring, said spring having corners, a spring corner post forming a part of each of said corners and projecting downwardly beneath said spring, a head rail adapted to cooperate with two of said posts, said head rail having spaced rail posts each of which is adapted to be placed in abutting relationship with one of the spring posts, means for maintaining abutting relationship between said corner posts and said rail posts comprising a recess formed in each of said rail posts, a pair of pins embedded in each of the latter posts, said pins having portions extending laterally through said recesses with one of said pins being spaced above the other in each of said recesses, each of said recesses opening outwardly of said rail posts and adapted to be placed in facing relationship with said spring corner posts, a connector for each corner post, each said connector comprising a web, said web comprising a substantially vertically extending member having a rear abutment surface facing and adapted to abut against its said spring corner post, a pair of hooks vertically spaced one above the other and connected to said web and extending downwardly parallel to said web, one of said hooks being spaced vertically above the other and defining a downwardly extending vertical slot with said web, a second slot opening outwardly from the first mentioned slot in a direction laterally of said web and extending between said hooks, the other of said hooks comprising a lower hook, forming a third slot with said web which extends parallel to said web and is vertically in alinement with the first mentioned slot, said first and third slots having recesses extending outwardly with respect to said web on the side of the latter said slots opposite said web, both of the latter named recesses being formed complementarily to said pins, said slots being adapted to freely slidingly receive said pins, said web and hooks being formed as a unitary member of a width adapted to be received within one of said recesses in said rail post and being received therein, a pair of studs connected to said web and extending laterally outwardly from said abutting face thereof substantially in horizontal alinement with said recesses in said first and third slots, the studs of each connector extending through said stud receiving openings in said spring corner posts, the latter openings being spaced vertically with respect to each other, connecting means within said spring corner posts cooperating with each of said studs to urge said pins into bearing relationship with the walls of said recesses in said connector slots and urging said abutting face of each connector toward its respective spring corner post and said spring corner posts into abutting relationship with said rail posts with said hooks and webs being received in said rail posts.

References Cited in the file of this patent

UNITED STATES PATENTS

| | | |
|---|---|---|
| 61,504 | Bartle | Jan. 29, 1867 |
| 1,551,984 | Dyke | Sept. 1, 1920 |
| 1,695,961 | Howse | Dec. 18, 1928 |
| 2,227,704 | Collins | Jan. 7, 1941 |
| 2,261,820 | Zimtbaum | Nov. 4, 1941 |
| 2,539,933 | Silverman | Jan. 30, 1951 |
| 2,648,074 | Jonas | Aug. 11, 1953 |
| 2,666,215 | Harris | Jan. 19, 1954 |